United States Patent
Magadevan et al.

(10) Patent No.: US 9,137,649 B2
(45) Date of Patent: Sep. 15, 2015

(54) SHORT CODE MANAGEMENT FOR MESSAGING CAMPAIGNS

(71) Applicant: T-Mobile USA, Inc., Bellevue, WA (US)

(72) Inventors: Poornima Magadevan, Bellevue, WA (US); Abha Bhatia, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/956,138

(22) Filed: Jul. 31, 2013

(65) Prior Publication Data

US 2015/0038181 A1 Feb. 5, 2015

(51) Int. Cl.
- *H04W 4/00* (2009.01)
- *H04L 29/06* (2006.01)
- *H04W 4/14* (2009.01)

(52) U.S. Cl.
CPC .................................. *H04W 4/14* (2013.01)

(58) Field of Classification Search
CPC .................................. H04W 4/14; H04W 4/12
USPC ......... 455/466, 414, 414.1–414.3, 415, 432.3
See application file for complete search history.

(56) References Cited

U.S. PATENT DOCUMENTS

| | | | |
|---|---|---|---|
| 2007/0183596 A1* | 8/2007 | Winkler | 380/247 |
| 2009/0156181 A1* | 6/2009 | Athsani et al. | 455/414.2 |
| 2010/0216494 A1* | 8/2010 | Abdel-Moiti Moik | 455/466 |
| 2011/0195728 A1* | 8/2011 | Sweatman et al. | 455/466 |
| 2012/0203638 A1* | 8/2012 | Kaplan | 705/14.64 |
| 2013/0080541 A1* | 3/2013 | Herbert | 709/206 |
| 2014/0066111 A1* | 3/2014 | LIN et al. | 455/466 |
| 2014/0172992 A1* | 6/2014 | Frederick et al. | 709/206 |

\* cited by examiner

*Primary Examiner* — Dung Hong

(74) *Attorney, Agent, or Firm* — Lee & Hayes, PLLC

(57) ABSTRACT

Techniques for managing assignment and reassignment of short codes are described herein. One or more computing devices may assign a short code to a first messaging campaign for a first time period. After expiration of the first time period, the one or more computing devices may then reassign the short code to a second messaging campaign for a second time period.

21 Claims, 4 Drawing Sheets

SHORT CODE MANAGEMENT FOR MESSAGING CAMPAIGNS

BACKGROUND

Text and multimedia messaging have become highly popular modes of communication among users of telecommunications devices. The most popular type of messaging, Short Message Service or "SMS" messaging, is a text messaging service of phone, Internet, or mobile telecommunications systems, using standardized communications protocols that allow the exchange of short text messages between fixed line or mobile telecommunications devices. Mobile telecommunications device users may create and transmit short text messages addressed to the phone number of the destination mobile telecommunications device. SMS standards were defined in 1985 as part of the Global System for Mobile Communications (GSM) series of standards, as a means of sending messages of up to 160 characters to and from GSM mobile handsets. Text messaging is now evolving into new protocols, including protocols based on IP Multimedia Subsystem or IMS technology.

With the growth in its popularity, text messaging has also become a useful communications mode for marketing. Marketers may create campaigns involving the creation and distribution of messages to multiple receiving devices. In many cases, such marketers don't use traditional telephone numbers for messages to and from receiving devices, but instead use short codes. Short codes are special numbers, significantly shorter than full telephone numbers, which can be used to address text or multimedia messages to and from telecommunications devices. Short codes are designed to be easier to read and remember than normal telephone numbers. Short codes may be used for a wide variety of campaigns, such as voting, ordering pizza or ringtones, competing for free concert tickets, and making charity donations. Messages sent to a short code can also be billed at a higher rate than standard messages, and may be used by a customer to subscribe to a recurring monthly service that will be added to the customer's mobile phone bill until the user texts, for example, the word "STOP" to terminate the service.

Because short codes are typically shorter than telephone numbers, however, there are a limited number of possible short codes. In the United States, short codes are typically five and six digits long and are made available to wireless telecommunications carriers and other entities through the Common Short Code Administration under authority of the Cellular Telecommunications Industry Association. Short codes can be leased at the rate of $1000 a month for a selected code or $500 for a random code from CSCA. Users of short codes can thus compile their own pools of leased short codes which they can use and reuse over the lifetime of the short code leases.

Wireless carriers and other entities that use short codes face many obstacles, due in part to the limited number of available short codes and to the difficulty in managing short code pools. Many such entities manage their short codes manually. Manual management may result in a variety of errors that negatively impact customer experience. For example, a short code used in connection with a short term promotion may be reassigned to a new promotion, resulting in receipt of messages from consumers who are replying to the previous campaign messaging. Manual management is also time consuming and expensive. In some instances, customers receiving short code messages may view them as spam, resulting in the customers placing the short code on a blacklist and thereby reducing the number of customers who receive future messages from that short code. In other instances, it is difficult to track responses to short code messages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques for managing assignment and reassignment of short codes are described herein. One or more computing devices may assign a short code to a first messaging campaign for a first time period. After expiration of the first time period, the one or more computing devices may then reassign the short code to a second messaging campaign for a second time period. During each time period, messages associated with the messaging campaign corresponding to that time period may be sent to recipient devices. These messages use the short code as a sender identifier.

Various examples or implementations will now be described. The following description provides specific details for these examples or implementations. It will be understand, however, that the examples or implementations may be practiced without many of these details. Likewise, it will also be understand that the examples or implementations may include many other features not described in detail herein.

The terminology used herein is to be interpreted in its broadest reasonable manner. Certain terms may even be emphasized below; however, any terminology intended to be interpreted in any restricted manner will be overtly and specifically defined as such in this Detailed Description section.

Overview

Figure 1:
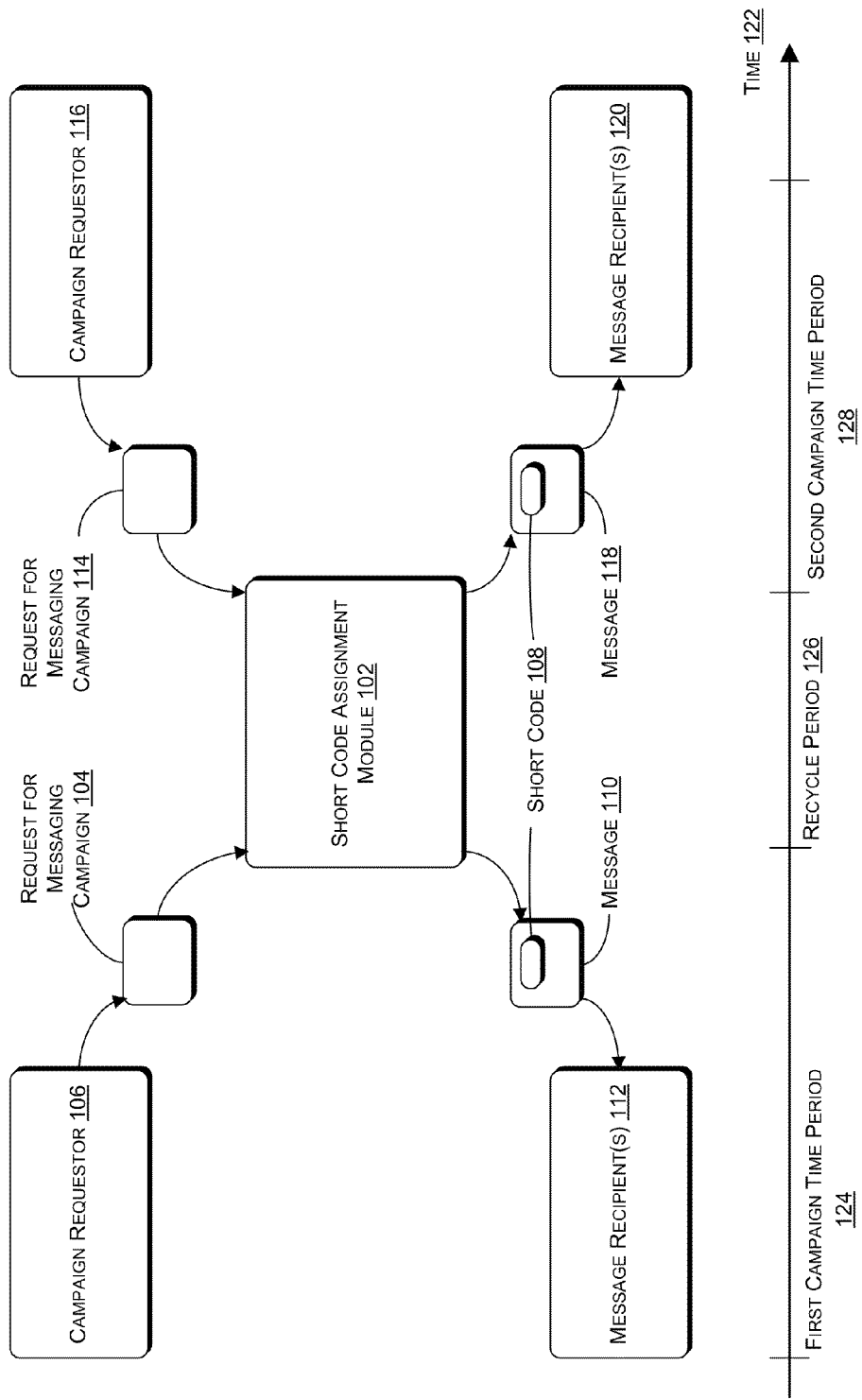
FIG. 1 illustrates a time-based flow chart showing the initial assignment and later reassignment of a short code as disclosed herein.

FIG. 1 illustrates a time-based flow chart showing the initial assignment and later reassignment of a short code as disclosed herein. The method and system includes a short code assignment module 102 that is configured to receive incoming requests for messaging campaigns that are related to short codes, and then assign or reassign short codes to messages associated with such campaigns according to rules. As illustrated in FIG. 1, short code assignment module 102 assigns a short code 108 at one time period—referred to as the "first campaign time period 124"—and then reassigns the short code 108 at a different time period—referred to as the "second campaign time period 128," these time periods shown along the time axis 122.

Figure 2:
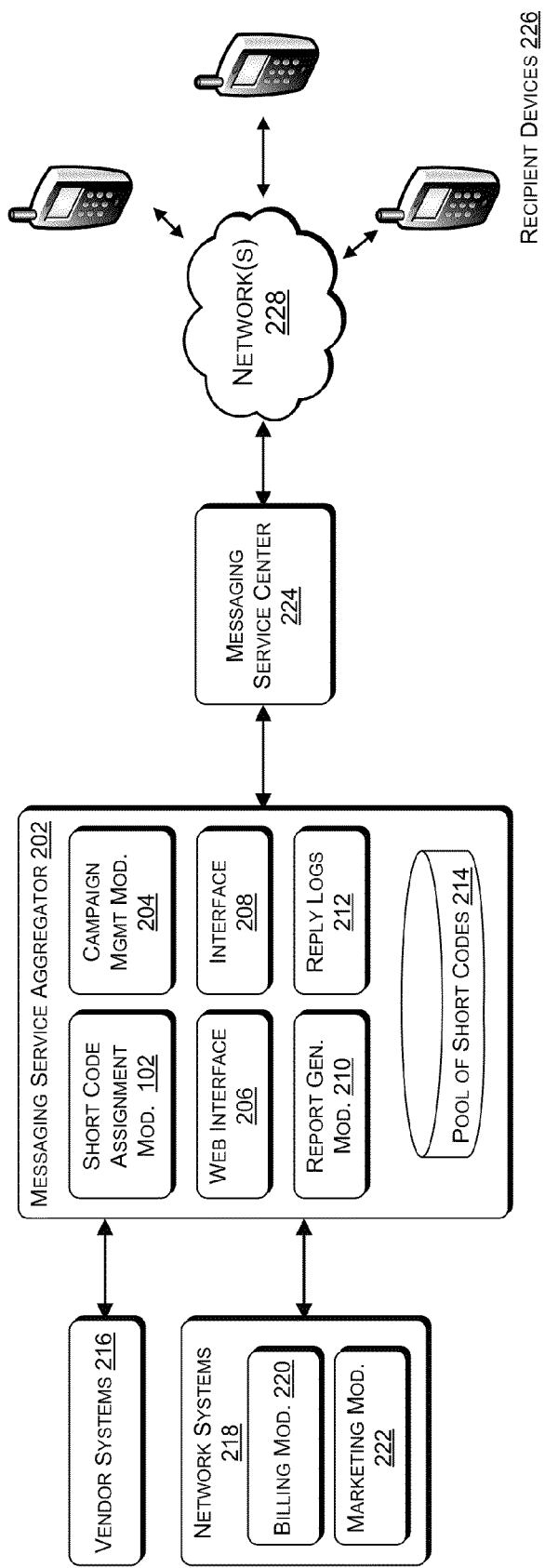
FIG. 2 illustrates an example architecture for the management of short codes as described herein.

Short code assignment module 102 may be a module of a messaging service aggregator, such as messaging service aggregator 202 presented in FIG. 2, or it may be a separate platform that is communicative with a messaging service aggregator 202. Short code assignment module 102 is configured to receive incoming requests for messaging campaigns, such as requests for messaging campaigns 104 and 114. Such incoming requests for messaging campaigns 104 and 114 may include parameters or content for the messaging campaign, a time period for the messaging campaign, a start date for the messaging campaign, or a recycle period for the messaging campaign. Such requests for messaging campaigns 104 and 114 are initiated by campaign requestors 106 and 116. The campaign requestors may be any system, entity, or individual seeking a messaging campaign, such a vendor associated with the vendor system 216 of FIG. 2 or the network operator associated with network systems 218 of FIG. 2.

As illustrated in FIG. 1, campaign requestor 106 has, at or before the beginning of a first messaging campaign that will run for the duration of first campaign time period 124, initiated a request for messaging campaign 104. Campaign requestor 106 may initiate such request in any variety of ways, such as by entering information relevant to the initiation of a messaging campaign via a computer user interface (not shown). A request for messaging campaign 104 is then generated and provided to short code assignment module 102.

Short code assignment module 102 then assigns a short code 108 in a short code pool (not shown) to a first messaging campaign and utilizes that short code 108 in a message 110 associated with the first messaging campaign. The short code 108 is used to identify the messaging campaign and also serves as a sender identifier that is includes in the message 110. The message 110 may be any sort of message, such as an SMS message or a multimedia messaging service (MMS) message.

The pool of short codes used from which the short code is assign may be updated by the short code assignment module 102 (e.g., on a periodic or event-driven basis) with an allocation of additional short codes.

When assigning the short code 108, the short code assignment module 102 may utilize one or more rules or criteria. For example, the short code assignment module 102 may assign the short code 108 when it is the least recently assigned short code and is past its recycle period. The short code assignment module 102 may also take other factors into account, such as whether the rule or criteria call for permanent allocation of a short code, or whether the messaging campaign request seeks temporary or permanent allocation of a short code. Additionally, the short code assignment module 102 may assign a same short code to two messaging campaigns that are determined to be related messaging campaigns based on the rules/criteria or based on the messaging campaign request. Such rules or criteria may also result in short code assignment module 102 assigning a short code based upon, for example and not limited, random selection, duration of nonuse, unique characteristics (such as a code that is easy to remember, like "12345"), predetermined association with a specific type of campaign, nonuse for a set period of dormancy, etc.

The short code assignment module 102 may then indicate the assigned short code 108 to a campaign management module of the messaging service aggregator to enable the campaign management module to transmit the message 110 to one or more message recipients 112.

At a later time, short code 108 has returned to a short code pool following its use during the first campaign period 124. Short code 108 is then not reassigned to any campaigns by short code assignment module 102 during a recycle period 126. The recycle period 126 may have been specified in the request for the first messaging campaign or may be a default recycle period. The short code assignment module 102 may automatically adjust a default recycle period for messaging campaigns based on a number or percentage of unassigned short codes in the pool of short codes In various embodiments, at a later time, a campaign requester 116 initiates a request for a messaging campaign 114. The request is received by short code assignment module 102, which then assigns the short code 108 to a second messaging campaign and utilizes the short code 108 as a sender identifier for a message 118 associated with the second messaging campaign. The reassignment of the short code 108 to the second messaging campaign may be based upon a rule or criteria permitting such reassignment only after the running of recycle period 126. The rule or criteria, which ensures that short code 108 remains dormant for a set recycle period 126, helps reduce or avoid consumer confusion that might result if short code 108 had been used on the second messaging campaign immediately following the termination of the first messaging campaign. In addition to that rule or criteria, other rules or criteria, such as selecting the least recently assigned short code, or any of the other rules or criteria mentioned above, may be used. Short code assignment module 102 reassigns short code 108 in accordance with such rules or criteria.

The short code assignment module 102 may then indicate the assigned short code 108 to a campaign management module of the messaging service aggregator to enable the campaign management module to transmit the message 118 to one or more message recipients 120.

Example Architecture

FIG. 2 illustrates an example architecture for the management of short codes as described herein. As illustrated in FIG. 2, short code assignment module 102 is a module of messaging service aggregator 202. Messaging service aggregator 202 is a platform that aggregates a variety of information and data relating to messages. Messaging service aggregator 202 also includes a campaign management module 204, a web interface 206, a messaging service center interface 208, a reports generation module 210, a data store of reply logs 212, and a pool of short codes 214. While it will be understand that although each of these items 102 and 204-214 are presented as being incorporated within messaging service aggregator 202, any of them may be separate from but communicative with messaging service aggregator 202.

Campaign management module 204 is configured to receive and manage information and data concerning one or more campaigns associated with messaging. The campaign management module 204 may receive a request for a messaging campaign via the web interface 206 or the interface 208. The messaging campaign may be associated with one of a product or service offering, a bill or billing cycle, or product or service information. The campaign management module 204 may then share the request with the short code assignment module 102 to enable the short code assignment module 102 to assign a short code to the messaging campaign. Upon receiving the short code from the short code assignment module 102, the campaign management module 204 may form a message, such as an SMS message or MMS message, in accordance with parameters or content received in the request for the messaging campaign. For example, the campaign management module 204 may include the received content in the message and identify message recipients based on the parameters.

Upon forming the message, the campaign management module 204 may provide the message via the interface 208 to the messaging service center 224 for transmission of the message to recipient devices 226. In some embodiments, the transmission may be responsive to the campaign management module 204 receiving or noting the occurrence of a triggering event. For example, the campaign management module 204 may form the message and await a trigger from the campaign requestor before transmitting the message. The campaign management module 204 may also receive replies to those messages and update the reply logs 212 with those replies. Further, the campaign management module 204 may provide reports generated by the report generation module 210 to the campaign requestor via the web interface 206 or interface 208.

Web interface 206 is any type of Internet-based user interface that permits a user, such as campaign requestors 106 and 116, to initiate campaigns, provide information sufficient for the campaign management module 204 to manage campaigns, and to receive reports from reports generation module 210 and other information relevant to campaigns, which may then be shared with the user through the web interface 206. Web interface 206 may receive from the user or from a user system, for example, parameters for a messaging campaign, content for a messaging campaign, a time period for a messaging campaign, a start date for a messaging campaign, or a recycle period for a messaging campaign.

Interface 208 is any type of interface that permits messaging service aggregator 202 to communicate with any one or more of the vendor system 216, network system 218 (such as a billing system 220 or marketing system 222), or messaging service center 224.

Reports generation module 210 is configured to prepare reports based on any information or data, such as reply logs 212. Some such information may be obtained, for example, from vendor systems 216 or network systems 218. These reports may provide results of a messaging campaign, such as replies to messages and other actions taken associated with the messages. For example, the reports may indicate the number of subscribers who received a message during the campaign period and purchased a service plan upgrade. Upon preparing a report, the reports generation module may 210 may provide the report to the campaign management module 204.

Reply logs 212 are a data store that captures any type of data relating to replies received from recipient devices 226 responsive to campaign messages. Such logs may associate each reply with a short code to which the reply was addressed. The short code assignment module 102 maps those short codes to campaigns and campaign requestors, and the campaign management module 204 and report generation module 210 may use these reply logs 212 and mappings in constructing reports and providing the reports to appropriate campaign requestors.

Pool of short codes 214 is a pool of short codes that have been obtained in any manner, including but not limited to by lease, for use in connection with campaigns. As mentioned above, the short code assignment module 102 updates the pool of short codes 214 with new allocations of short codes. In some embodiments, short codes may be leased for a limited period of time and may be removed from the pool of short codes 214 when that limited time expires. Also, in some embodiments, the pool of short codes 214 includes multiple categories of short codes for respective categories of messaging campaigns.

Messaging service aggregator 202 may be communicative with vendor systems 216. Vendor systems 216 may be associated with any type of vendor, including commercial vendors, governmental entities, charitable entities, etc. For example and not limitation, vendor systems 216 may be associated with an advertising agency that has initiated a campaign and receives information and data, such as reports from the messaging service aggregator 202 via the interface 208.

Messaging service aggregator 202 may be communicative with certain network systems 218. Network systems 218 may be associated with any type of telecommunications network that is capable of transmitting messages, such as a wireless telecommunications carrier that owns or operates messaging service center 224. Network systems 218 may include a billing module 220 and a marketing module 222. Billing module may receive data and other information from messaging service aggregator 202 sufficient to generate billing records that may be applied to, for example, a monthly billing statement associated with one of recipient devices 226, by virtue of such device's reply to a message associated with a campaign. Marketing module 222 may receive data and other information from messaging service aggregator 202 such as reports detailing the conduct of a campaign, responses received from messaging devices, and other data that may assist in determining the success of a campaign. The billing module 220 and marketing module 222 may also receive data from other sources and share that data with the messaging service aggregator 202 to enable the messaging service aggregator 202 to generate reports.

Messaging service aggregator 202 is communicative with a messaging service center 224. Messaging service center 224 is any type of service center configured to dispatch, route, receive and store messages. For example and not limitation, a short message service center or SMSC is a server that handles the dispatch, routing, receiving and storing of SMS messages. Similarly, a multimedia messaging service center or MMSC is a server that handles the dispatch, routing, receiving and storing of MMS messages. The messaging service center 224 may receive messages from the messaging service aggregator 202, transmit those messages to recipient devices 226 over the network(s) 228, receive replies from the recipient devices 226 over the network(s) 228, and provide those replies to the messaging service aggregator 202.

Network(s) 228 are any type of IP-based or telecommunications networks that may serve any of receiving devices 228. For example, a cellular telecommunication network is a type of network 228 that serves recipient devices 226.

Recipient devices 226 include any type of IP-based or telecommunications device that is capable of receiving and responding to messages. For example, recipient devices may include cell phones and smart phones, as presented in FIG. 2, but may also include any type of communicative computing device, such as desktop computers, tablet computers, netbooks, notebook computers, etc.

Example Process

Figure 3:
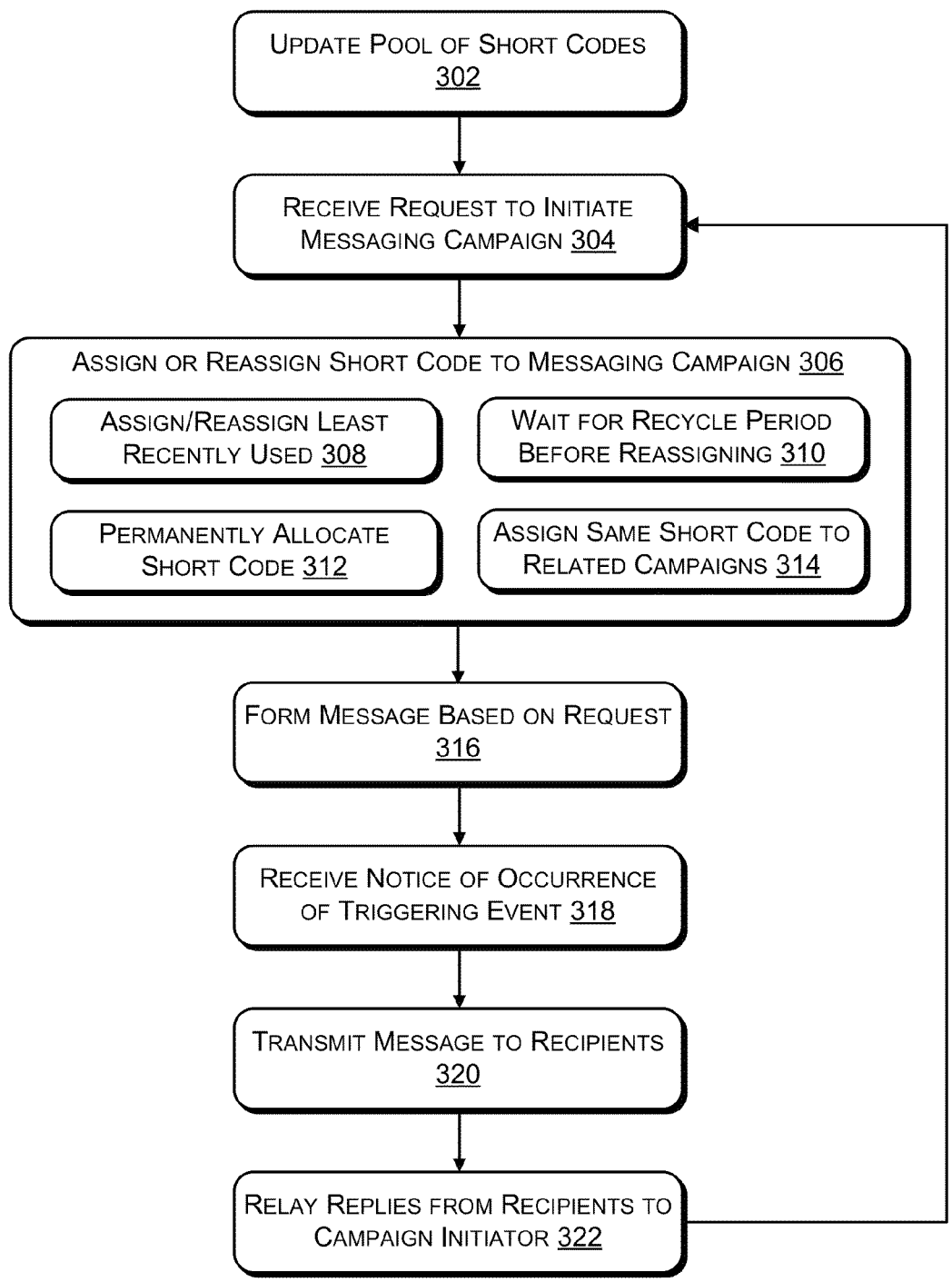
FIG. 3 illustrates an example process for the management of short codes as described herein.

FIG. 3 illustrates an example process for the management of short codes as described herein. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for the management of short codes at a messaging service aggregator. At 302, the messaging service aggregator receives an updated allocation of one or more short codes which it adds to a pool of short codes. Such short codes may be received in any manner. The pool of short codes may include multiple categories of short codes for respective categories of messaging campaigns.

At 304, the messaging service aggregator receives a request to initiate a new messaging campaign. The receiving at 304 may include receiving parameters or content associated with the new messaging campaign, such as identification of a type of campaign, draft text and other media for inclusion in the message, identification of targeted recipient devices, etc. The receiving at 304 may also include receiving a time period for the new messaging campaign, a start date for the first messaging campaign, and a recycle period. Such request may be provided by a campaign requestor via a web interface or via any other means.

At 306, a short code assignment module of the message service aggregator assigns or reassigns a short code from the short code pool to a messaging campaign for a time period. At 308, the assigning/reassigning may include assigning or reassigning the least recently assigned or reassigned short code in the pool of short codes. The assigning or reassigning at 308 may further include automatically adjusting a default recycle period for messaging campaigns based on a number or percentage of unassigned short codes in the pool of short codes. At 310, the assigning/reassigning may include waiting for a recycle period after the expiration of a messaging campaign before performing the reassigning. The recycle period may either be a default time period or specified in a request for a messaging campaign. At 312, the assigning/reassigning may include permanently allocating a short code to the messaging campaign. At 314, the assigning/reassigning may include assigning the short code to a different messaging campaign that is associated with the messaging campaign.

At 316, the messaging service aggregator forms a message associated with the assigned/reassigned short code based on parameters and content included in the request to initiate the messaging campaign.

At 318, the messaging service aggregator receives notice of the occurrence of a triggering event.

At 320, the messaging service aggregator transmits the message associated with the messaging campaign, the message utilizing the assigned/reassigned short code to identify the messaging campaign.

At 322, the messaging service aggregator receives a reply to the message and relays the reply to a person or entity that requested initiation of the messaging campaign.

Following any of 306-322, the short code assignment module may reassign, at 306, the short code used for the messaging campaign for the time period to a different messaging campaign for a different time period.

Example Device

Figure 4:
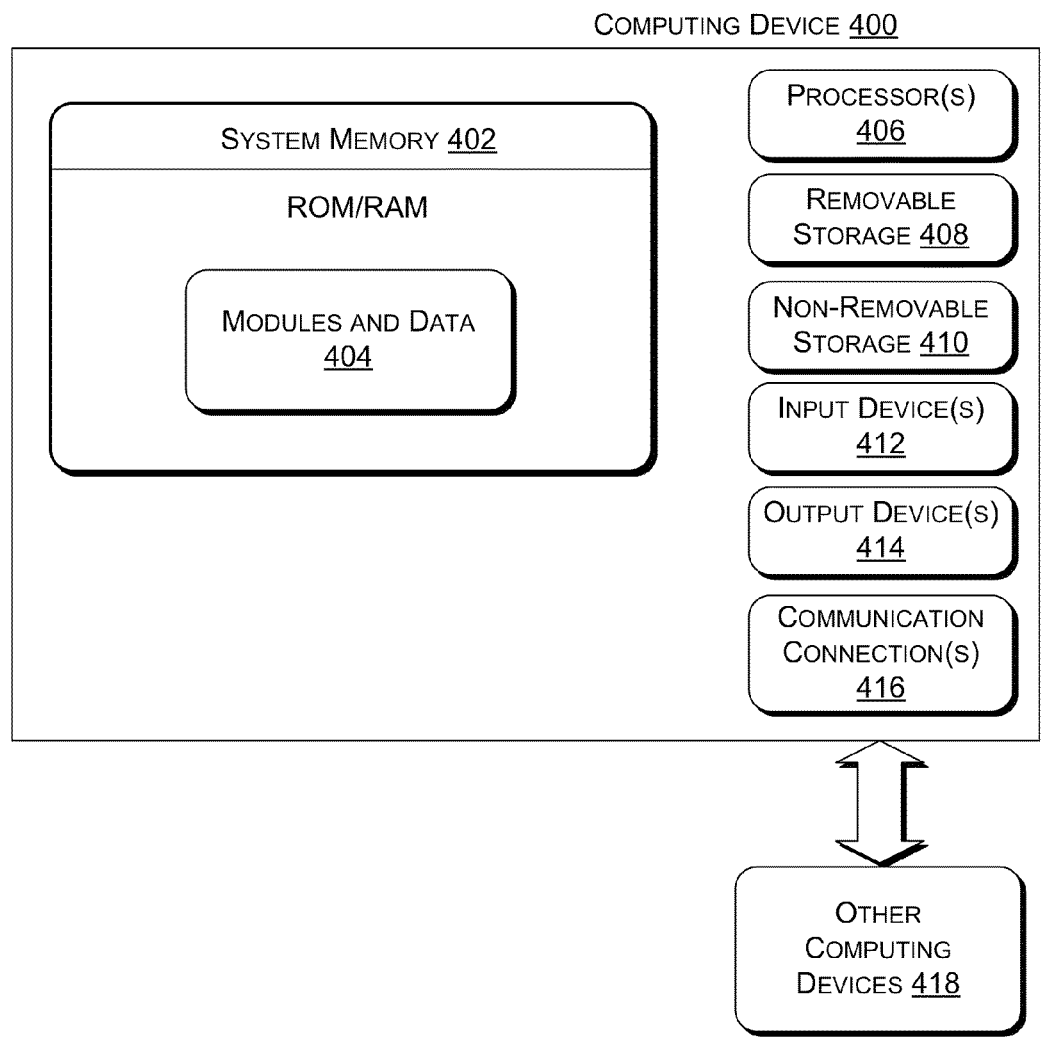
FIG. 4 illustrates an example computing device capable of serving as a messaging service aggregator as described herein.

FIG. 4 illustrates an example computing device 400 capable of serving as a messaging service aggregator 202. As illustrated, computing device 400 comprises a system memory 402 storing modules and data 404. Also, computing device 400 includes processor(s) 406, a removable storage 408 and non-removable storage 410, input device(s) 412, output device(s) 414 and communication connections 416 for communicating with other computing devices 418.

In various embodiments, system memory 402 is volatile (such as RAM), non-volatile (such as ROM, flash memory, etc.) or some combination of the two. The modules or data 404 stored in the system memory 402 may comprise methods, threads, processes, applications or any other sort of executable instructions, such as the short code assignment module 102, campaign management module 204, web interface 206, interface 208, reports 210, reply logs 212, or pool of short codes 214. The modules and data 404 may also include files and databases.

In some embodiments, the processor(s) 406 is a central processing unit (CPU), a graphics processing unit (GPU), or both CPU and GPU, or other processing unit or component known in the art.

Computing device 400 also includes additional data storage devices (removable and/or non-removable) such as, for example, magnetic disks, optical disks, or tape. Such additional storage is illustrated in FIG. 4 by removable storage 408 and non-removable storage 410. Tangible computer-readable media may include volatile and nonvolatile, removable and non-removable media implemented in any method or technology for storage of information, such as computer readable instructions, data structures, program modules, or other data. System memory 402, removable storage 408 and non-removable storage 410 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 400. Any such tangible computer-readable media may be part of the computing device 400.

Computing device 400 also has input device(s) 412, such as a keyboard, a mouse, a touch-sensitive display, voice input device, etc., and output device(s) 414 such as a display, speakers, a printer, etc. These devices are well known in the art and need not be discussed at length here.

Computing device 400 also contains communication connections 416 that allow the computing device 400 to communicate with other computing devices 418, such as vendor systems 216, network system 218, or messaging service center 224.

CONCLUSION

Unless the context indicates otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Words in the above Detailed Description using the singular or plural number may also include the plural or singular number respectively. The word "or," in reference to a list of two or more items, covers all of the following interpretations of the word: any of the items in the list, all of the items in the list, and any combination of the items in the list The above Detailed Description of examples of the invention is not intended to be exhaustive or to limit the invention to the precise form disclosed above. While specific examples for the invention are described above for illustrative purposes, various modifications are possible, as will be recognized. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The techniques provided herein can be applied to other systems besides the system described above. The elements and acts of the various examples described above can be combined to provide further implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a pool of short codes;
   a short code management module configured to be operated by the one or more processors to:
      assigning, by one or more computing devices, a short code to a first messaging campaign for a first time period; and
      after expiration of the first time period, reassigning, by the one or more computing devices, the short code to a second messaging campaign for a second time period,
      wherein the short code is assigned and reassigned from a pool of short codes and a recycle period for messaging campaigns is adjusted based on a number or percentage of unassigned short codes in the pool of short codes.

2. The system of claim 1, further comprising:
   a user interface to receive information associated with a request to initiate the first messaging campaign or the second messaging campaign;
   a messaging service aggregator which includes the short code management module, the messaging service aggregator to receive the request to initiate the first messaging campaign or the second messaging campaign from the user interface, to form a message utilizing the short code and the received information, and to provide the message to a messaging service center; and
   the messaging service center to transmit the message to one or more recipients and to receive replies from the one or more recipients.

3. The system of claim 1, further comprising at least one interface for at least one of a billing system, a marketing system, or an outside vendor.

4. The system of claim 1, wherein the short code management module is further to receive allocation of additional short codes and to update the pool of short codes with the additional short codes.

5. A method comprising:
   assigning, by one or more computing devices, a short code to a first messaging campaign for a first time period; and
   after expiration of the first time period, reassigning, by the one or more computing devices, the short code to a second messaging campaign for a second time period,
   wherein the short code is assigned and reassigned from a pool of short codes and a recycle period for messaging campaigns is adjusted based on a number or percentage of unassigned short codes in the pool of short codes.

6. The method of claim 5, further comprising receiving a request to initiate the first messaging campaign and performing the assigning in response to receiving the request.

7. The method of claim 6, wherein the receiving comprises receiving parameters or content associated with the first messaging campaign.

8. The method of claim 6, wherein the receiving comprises receiving a time period for the first messaging campaign and a start date for the first messaging campaign.

9. The method of claim 5, further comprising transmitting a message associated with the first messaging campaign, the message utilizing the short code to identify the first messaging campaign.

10. The method of claim 9, wherein the transmitting is responsive to a triggering event occurring subsequent to the assigning.

11. The method of claim 5, wherein the short code is the least recently assigned or reassigned short code in the pool of short codes.

12. The method of claim 11, wherein the pool of short codes includes multiple categories of short codes for respective categories of messaging campaigns.

13. The method of claim 5, further comprising waiting for the recycle period after the expiration of the first messaging campaign before performing the reassigning.

14. The method of claim 13, wherein the recycle period either is a default time period or is specified in a request for a messaging campaign.

15. The method of claim 5, further comprising assigning the short code to a third messaging campaign that is associated with the second messaging campaign.

16. One or more non-transitory computer-readable media storing computer-executable instructions that, when executed by one or more computing device, cause the one or more computing devices to perform operations comprising:
   receiving a request to initiate a first messaging campaign;
   reassigning a short code from a second messaging campaign to the first messaging campaign for a first time period, wherein a second time period for the second messaging campaign expires before the short code is reassigned; and
   transmitting a message associated with the first messaging campaign, the message utilizing the short code to identify the first messaging campaign,
   wherein the short code is assigned and reassigned from a pool of short codes and a recycle period for messaging campaigns is adjusted based on a number or percentage of unassigned short codes in the pool of short codes.

17. The one or more non-transitory computer-readable media of claim 16, wherein the message is a short message service (SMS) or multimedia messaging service (MMS) message and utilizes the short code as a sender identifier.

18. The one or more non-transitory computer-readable media of claim 16, wherein the operations further comprise forming the message based on parameters and content included in the request to initiate the first messaging campaign.

19. The one or more non-transitory computer-readable media of claim 16, wherein the first messaging campaign or the second messaging campaign is associated with at least one of a product or service offering, a bill or billing cycle, or product or service information.

20. The one or more non-transitory computer-readable media of claim 16, wherein the operations further comprise receiving a reply to the message and providing the reply to a person or entity that requested initiation of the first messaging campaign.

21. The one or more non-transitory computer-readable media of claim 16, wherein the operations further comprise receiving another request to initiate a third messaging campaign and permanently allocating another short code to the third messaging campaign.

\* \* \* \* \*